United States Patent [19]

Hatanaka et al.

[11] Patent Number: 5,581,364
[45] Date of Patent: Dec. 3, 1996

[54] METHOD FOR RECORDING AND/OR REPRODUCING IMAGE SIGNALS AND AN APPARATUS THEREFOR UTILIZING TWO DIMENSIONAL SCANNING OF A RECORDING MEDIUM BY A PROBE

[75] Inventors: Katsunori Hatanaka, Yokohama; Kunihiro Sakai, Isehara; Haruki Kawada, Yokohama; Ryo Kuroda, Machida, all of Japan

[73] Assignee: Canon Kabushiki Kaisha, Tokyo, Japan

[21] Appl. No.: 354,057

[22] Filed: Dec. 6, 1994

Related U.S. Application Data

[63] Continuation of Ser. No. 845,253, Mar. 3, 1992, abandoned.

[30] Foreign Application Priority Data

Mar. 6, 1991 [JP] Japan ................................ 3-040112

[51] Int. Cl.$^6$ .................................................. H04N 5/76
[52] U.S. Cl. .................................................. 386/46
[58] Field of Search .................................. 358/342, 335, 358/907, 312, 323; 360/33.1, 10.1; 369/126, 111; H04N 5/76

[56] References Cited

U.S. PATENT DOCUMENTS

| | | | |
|---|---|---|---|
| 4,481,616 | 11/1984 | Matey | 369/126 |
| 4,482,925 | 11/1984 | Sugiyama et al. | 358/342 |
| 4,544,957 | 10/1985 | Moriya et al. | 358/322 |
| 4,727,532 | 2/1988 | Giddings | 358/342 |
| 4,829,368 | 5/1989 | Kobayashi et al. | 358/334 |
| 5,107,112 | 4/1992 | Yanagisawa et al. | 250/306 |
| 5,144,581 | 9/1992 | Toda et al. | 369/126 |

FOREIGN PATENT DOCUMENTS

| | | |
|---|---|---|
| 63-161552 | 5/1988 | Japan . |
| 63-161553 | 5/1988 | Japan . |
| 1-107341 | 4/1989 | Japan . |
| 1-151035 | 6/1989 | Japan . |

OTHER PUBLICATIONS

G. Binning et al, "Surface Studies by Scanning Tunneling Microsciopy", Physical Review letters, Jul. 5, 1982, pp. 57–60.

*Primary Examiner*—Thai Q. Tran
*Assistant Examiner*—Huy Nguyen
*Attorney, Agent, or Firm*—Fitzpatrick, Cella, Harper & Scinto

[57] ABSTRACT

A method for recording and/or reproducing images includes a step of performing a two dimensional scanning on a recording medium with a probe electrode which relatively returns in the X direction for the main scanning and in the Y direction for sub-scanning. The main scanning of the probe is performed at a frequency which is one positive integerth of the horizontal synchronous frequency of the image signal so as to enable the period required for returning of the probe electrode to be matched with the blanking period of the image signal. Thus, it is possible to avoid any data recording and reproducing operations during the period required for returning of the scanning probe electrode.

14 Claims, 4 Drawing Sheets

METHOD FOR RECORDING AND/OR REPRODUCING IMAGE SIGNALS AND AN APPARATUS THEREFOR UTILIZING TWO DIMENSIONAL SCANNING OF A RECORDING MEDIUM BY A PROBE

This application is a continuation of application Ser. No. 07/845,253, filed Mar. 3, 1992, now abandoned.

BACKGROUND OF THE INVENTION

1. Field of the Invention

The present invention relates to a recording/reproducing apparatus for dynamic image data such as HDTV and NTSC, and static image data such as SV. Particularly, the invention relates to a driving method for recording probe electrode for a miniaturized high density recording/reproducing apparatus which utilizes the principle of STM.

2. Related Background Art

Along the evolution of the laser technology in recent years, inexpensive high density recording media have been developed with the optical memory which uses an organic dye, photopolymer, or other organic thin film.

On the other hand, the scanning type tunnel microscope (hereinafter referred to as STM) has been developed recently, which makes possible direct observations of the electronic structure of surface atoms of conductors [G. Binning et al. Phys. Rev. Lett, 49, 57 (1982)]. As a result, the high resolution measurement of a real spatial image can be performed irrespective of whether it is monocrystalline or amorphous. There are still more advantages that the observation is possible with a low voltage without causing any damage to a specimen due to the running current while the operation can be executed in the atmosphere for various materials. Therefore, its wide range applications are expected.

The STM utilizes the tunnel current which flows between a probe electrode and a conductive substance when they approach each other as close as approximately 1 nm while a voltage is being applied. This tunnel current is quite sensitive to the variations of distance between them, and it is possible to read various pieces of information about the entire electronic clouds in a real space by scanning the probe electrode so that the tunnel current is kept constant. In this case, the resolution in the in-plane direction is approximately 0.1 nm.

With the utilization of the STM principle, therefore, a high density recording and reproducing can be performed satisfactorily with atomic order (sub-nanometers). For example, in a recording and reproducing apparatus disclosed in Japanese Patent Laid-Open Application No. 61-80536, the atomic particles adsorbed on the surface of medium are removed by an electron beam or the like to perform writing, and the data is reproduced by STM.

There is disclosed in Japanese Patent Laid-Open Application No. 63-161552 and No. 63-161553, a method for performing the recording and reproducing by the STM using a material having memory effect as a recording layer such as a π electronic organic compound or a thin film of chalcogens compound for the switching characteristics of voltage current. According to this method, recording and reproducing with mass-memory as many as $10^{12}$ bits/cm$^2$ are possible assuming that the recording bit size is 10 nm.

Now, in order to practice this method as an actual apparatus to perform recording to and reproducing from a memory medium, it is necessary to maintain the space between the recording layer and the probe electrode at a distance where the tunnel current flows as well as to allow the probe electrode to scan along the tracking groove of the recording layer.

Conventionally, as a scanning method for the probe electrode, there is disclosed a method in Japanese Patent Laid-Open Application No. 1-151035 and No. 1-107341 in which a spiral groove is formed on the recording medium surface on a disc in the same manner as applied to a video disc or the like, and the recording and reproducing are performed as if the probe electrode follows this groove.

It is a suitable method that image data is recorded on a disc type recording medium because image data is continuous and so-called sequential recording and reproducing are mainly required.

When a recording/reproducing apparatus using this STM principle is used as an image data memory, the size of a recording medium needed to satisfy the recording volume of $10^{12}$ bits, which is required for recording HDTV image data for one to two hours, is only 1 cm$^2$. However, it is extremely difficult to control the distance between the recording layer and the probe electrode to be kept within a range (usually, 1 nm or less) for flow of the tunnel current while such a small recording medium is rotated at a high speed.

On the other hand, with a method for performing the recording with the probe which scans the recording medium surface in the x-y directions two dimensionally, it is relatively easy to control the distance between the probe electrode and the recording layer as compared with the above-mentioned example. However, since there is a problem that no recording and reproducing are possible at the returning point of the probe scanning, in this method it is difficult to handle any continuous signal such as an image signal.

SUMMARY OF THE INVENTION

In a recording and reproducing method or apparatus using the STM principle, it is an object of the present invention to provide a technique capable of writing directly to or reading out from a recording layer the large volume and continuous data of dynamic or static pictures without any timing adjustment executed by a line buffer memory or the like.

According to one aspect of the present invention to achieve the above-mentioned object, it is possible to match a blanking period of an image signal with a period required for returning of probe electrode scanning by performing a main scanning of the probe electrode with a frequency which is one positive integerth of a horizontal synchronizing frequency of the image signal when an image recording and/or reproducing is performed with the main scanning of the probe electrode on a recording medium to return in the X direction relatively and the sub-scanning in the Y direction to scan two dimensionally. In this way, the operation of the data recording/reproducing can be avoided during the period required for the probe electrode to effectuate its scanning return.

DETAILED DESCRIPTION OF THE PREFERRED EMBODIMENTS

Figure 1:
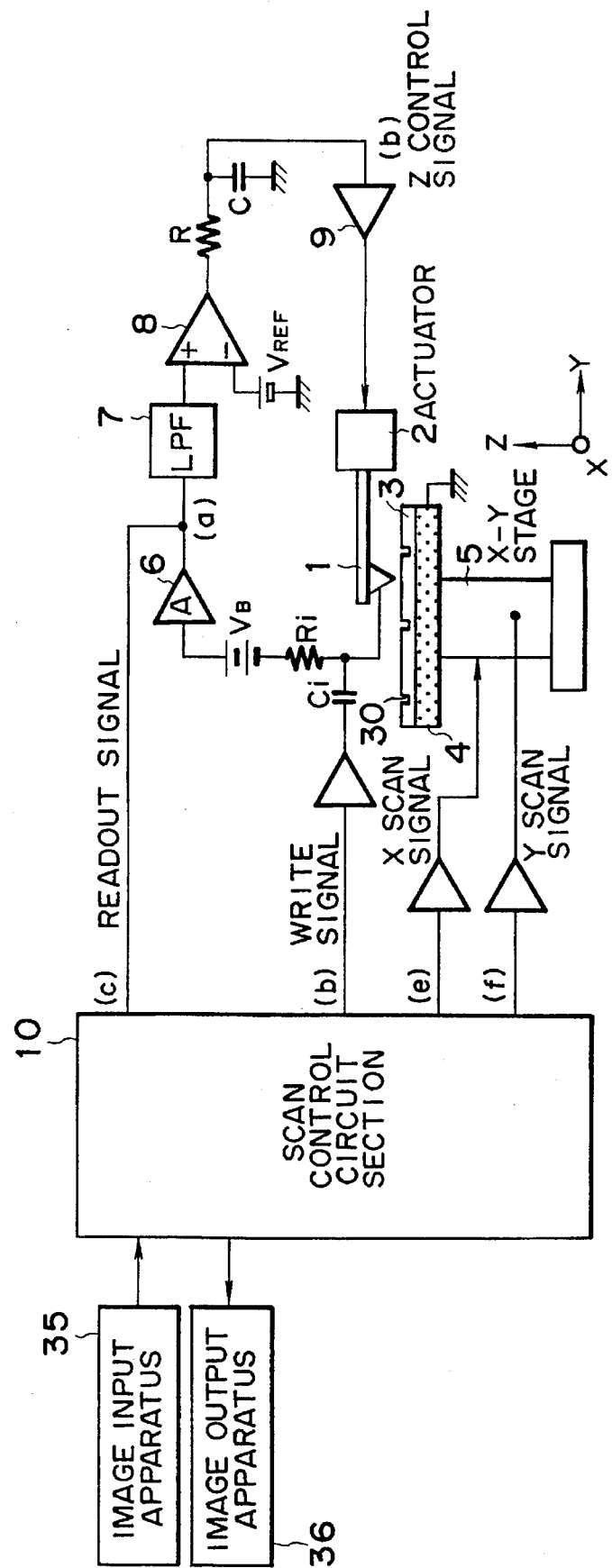
FIG. 1 is a block diagram illustrating a recording and reproducing method according to the present invention.

FIG. 1 is a block diagram illustrating the structure of an embodiment of an image recording/reproducing apparatus according to the present invention. In FIG. 1, a reference numeral 1 designates a probe electrode; 2, an actuator for displacing the probe electrode in z-axis direction; 3, a recording layer; 30, a tracking groove formed on the recording layer; and 4, a conductive substrate. In this respect, for the recording layer 3, any material may be used if only such a material is capable of detecting the information written on the recording layer by the tunnel current flowing between the probe electrode and the recording layer. For a material used for a recording effectuated by forming irregularities on its surface, for example, an HOPG (highly oriented pyrolithic graphite) cleavage substrate, Si wafer, Au, Ag, Pt, Mo, Cu or other thin metallic film formed by a vacuum deposition or an epitaxial growth, $Rh_{25}Zr_{75}$, $Co_{35}Tb_{65}$ and other glass metal can be exemplified. Also, for a material used for a recording by changing the electronic states of the recording layer, a thin film layer of amorphous Si, $\pi$ electronic organic compound, chalcogens compound, or other can be exemplified.

A reference numeral 5 designates an X-Y stage driven by scanning signals (e) and (f); 6, an amplifier which detects the tunnel current flowing through the recording layer 3 between the probe electrode 1 and conductive substrate 4 to convert it into a voltage; 7, a low pass filter which cuts off the signals written in the data band area on the recording layer by the output from the amplifier 6 to generate a voltage corresponding to average space between the probe electrode and the recording layer; 8, a differential amplifier for detecting the differential between the output of the low pass filter and reference voltage $V_{REF}$; 9, a driver for driving the actuator 2. Also, a reference numeral 10 designates a scan control circuit section which performs the overall control of the entire system, to which image signals are inputted from an image input apparatus 35 such as a video camera and from which the image signals are output to an image output apparatus 36 such as a CRT monitor.

The probe electrode control in the z-axis direction is performed by a feed back loop constituted by the members 1, 6, 7, 8, 9, and 2. In other words, the tunnel current which reflects a distance between the probe electrode and recording layer is detected by the amplifier 6, and a signal of average space is obtained by the low pass filter 7. This signal is compared with the reference voltage, and the differential voltage thus obtained is integrated (by RC circuit) to drive the actuator 2 by the driver 9. With such an operation as above, the probe electrode is controlled to maintain a constant average space with the recording layer all times.

Now, in conjunction with FIG. 2, the scan control circuit section 10 shown in FIG. 1 will be described in detail. The readout signal which is output (a) from the amplifier 6 is passed through a high pass filter (HPF) 23, so that only data component is extracted from the information written on the recording layer of the recording medium. This data signal is demodulated by an image signal demodulator 16, and further, an image composite signal reproduced by obtaining a synchronous signal from an internal synchronous signal generator 15 is output to an external image output apparatus. Also, the image composite signal which is inputted from an external input apparatus is separated by an image signal separation circuit 11 into image signal components and synchronous signal components. The separated image signals are converted by a modulator 12 into data pulse trains to be written on the recording layer. The pulse trains are applied to the probe electrode by a pulse generator 13 to perform the recording. A reference numeral 14 is a synchronous separation circuit into which either the external synchronous signal separated by the image signal separation circuit 11 is inputted when recording or the output of the internal synchronous signal generator 15 is inputted when reproducing by way of switching them by a switch SW. This circuit 14 separates horizontal and vertical synchronous signals, respectively. These synchronous signals are inputted into the horizontal and vertical oscillation circuits 17 and 18 as the synchronous pulses, respectively. The outputs from the horizontal and vertical oscillation circuits 17 and 18 are divided by dividers 19 and 20, respectively, and then, are shaped by scan waveform generators 21 and 22 into respective triangular waveforms, to drive the x-y stage.

In an apparatus according to the present embodiment, a main scanning area is guided by the tracking groove 30 formed on the recording layer to perform the recording, reproducing, and erasing (zero recording). The signal from this tracking groove 30 generates a timing signal to cause the probe electrode 1 to cross the tracking groove 30 by comparing the signal (a) with the standard voltage $V_{EG}$ by means of a comparator 24 and then through an edge detection circuit 25. After this, a phase detection is made by the timing signal and the divider output of the horizontal oscillation circuit 17 to detect the phase deviation between the tracking pattern and X-scanning. Further, a control signal is output from a phase detection controller 26 to make this deviation constant (that is, to match the phase with a position corresponding to the returning point on the one side of the X-scanning), and subsequent to having averaged it by a low pass filter (LPF) 27, a tracking correction voltage is superimposed over the X-scanning voltage by an adder 28.

Figure 2:
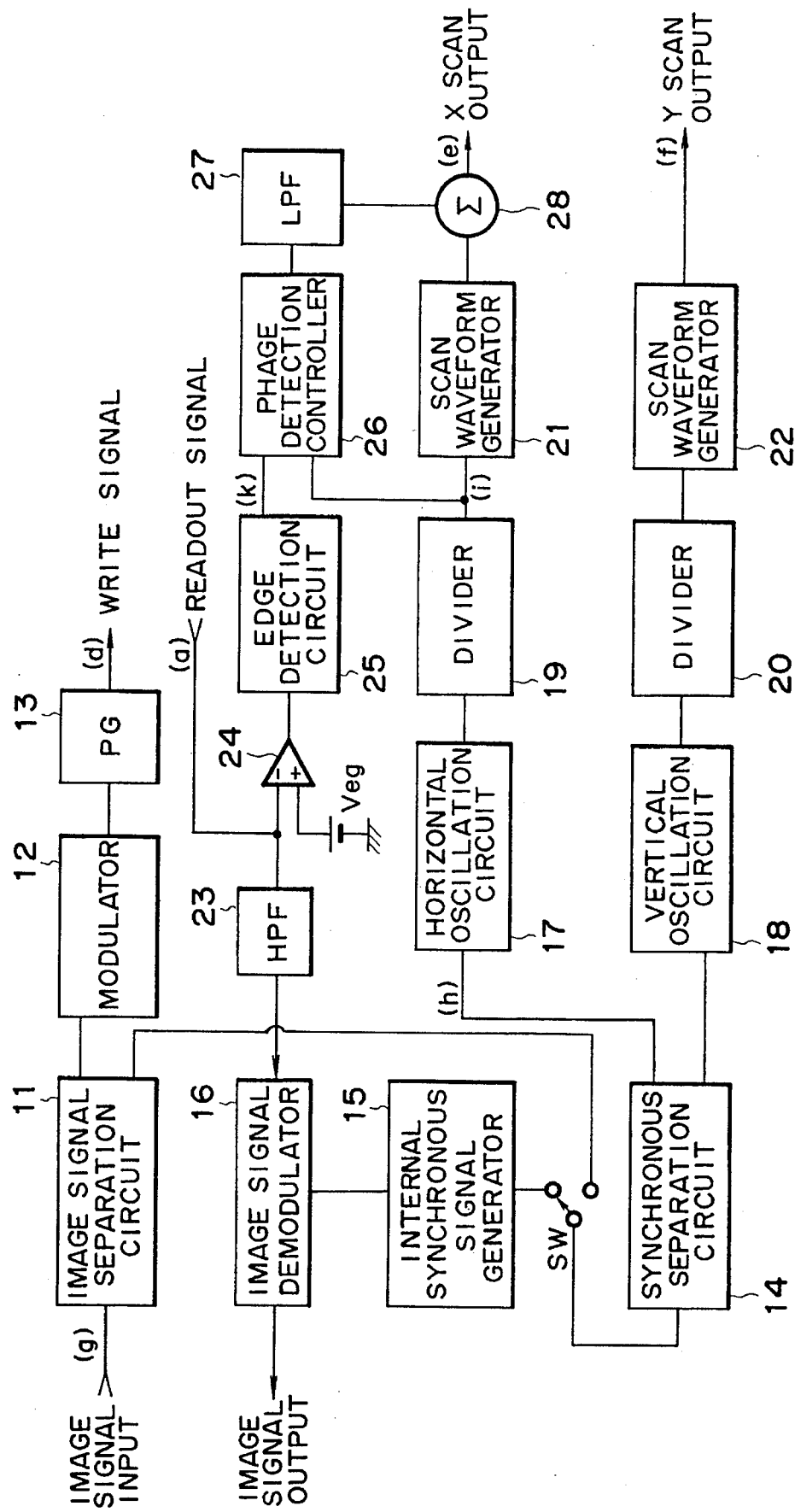
FIG. 2 is a block diagram illustrating the details of the scanning control circuit section shown in FIG. 1.
Figure 3:
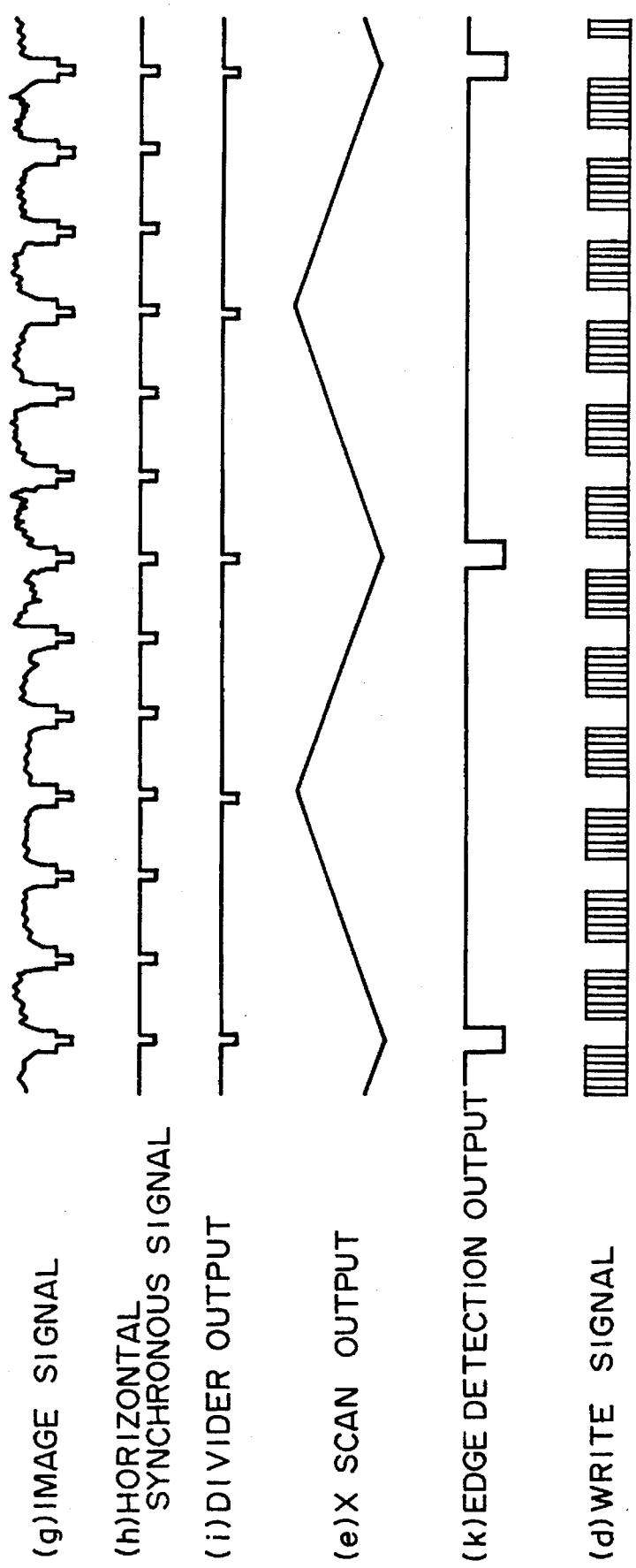
FIG. 3 is a view illustrating the timing of the operations shown in FIG. 2.

FIG. 3 is a view showing the timing chart of each signal when the X-scanning output and writing signal are generated from the image signal input by the structure shown in FIG. 2. As clear from FIG. 3, in the embodiment a main scanning of the probe electrode 1 is performed with a frequency which is one sixth of the horizontal synchronizing frequency of the image signal (g) to match the period required for returning of the probe electrode 1 with the blanking period of the image signal. Thereby avoiding any data recording/reproducing operations during the period required for returning of the probe electrode 1. Of course, it is not limited to the one sixth (⅙) but is good enough if it is one positive integerth (1/n; n: positive integer).

Figure 4:
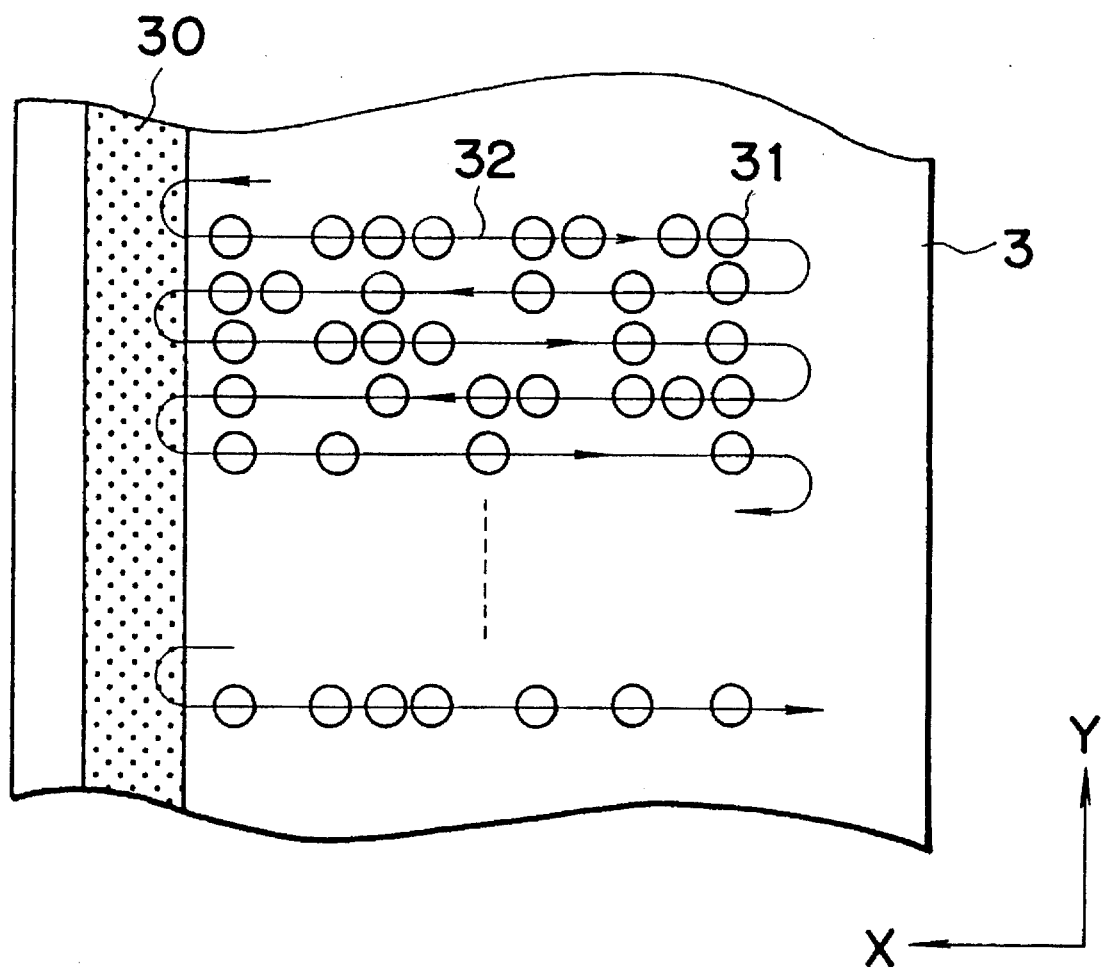
FIG. 4 is a view showing the scanning path of the probe electrode on a recording medium.

Also, FIG. 4 illustrates an example of the scanning state of the probe electrode on a recording medium. In FIG. 4, a reference numeral 30 designates a pattern of the tracking groove; 31, recording data bit, and 32, tracing path of the probe electrode.

For the apparatus according to the present embodiment it is possible to perform the recording and reproducing operations both for a dynamic image such as HDTV and NTSC and a static image such as SV.

In the case of a dynamic image, a sub-scanning of the probe electrode is performed continuously in the Y direction. In this case, the sub-scanning of Y-direction is not necessarily of a straight line. For example, the apparatus may be constructed so that a Y-scanning is performed along spiral tracking groove and the X-scanning for main scanning is performed in the direction intersecting the Y scanning. In this case, the speed for Y direction sub-scanning is quite slow and no high-speed revolution is needed. Therefore, there is no problem encountered in the conventional example which necessitates the structural control as described earlier.

Also, if a plurality of probes are used, the apparatus can be suitably adopted for recording and reproducing color images. In other words, if three probes are prepared respectively for the three primary colors of R, G, and B, then it is possible to record R, G, and B data in parallel respectively, and to obtain a high quality image recording.

Meanwhile, in the case of a static image, the frequency of the Y direction scanning is equalized with the field frequency or the frame frequency to record the image data for one image plane per track. In this case, the data recording is impossible during the period for returning of the probe electrode in the Y-scanning. However, if plural probe electrodes are employed as described above, the recording and reproducing can be operated without any interruption. Also, even with a single probe, it is possible to record and reproduce continuously the data for one image plane with so-called interlaced scanning in which the recording is performed so as not to allow the respective tracing paths of the X-scanning to be overlapped with going and returning of Y-scanning on the recording surface.

In the above-mentioned embodiment, the image signal which is an analogue signal is modulated by a modulator into the pulse number or pulse width for recording, but any type of modulating method are applicable to the present invention. For example, it is applicable to a recording method in which image signals are converted into digital data and then the encoded data are recorded.

In a recording/reproducing apparatus using the STM principle, it is possible to write directly to or readout from a recording layer a large and continuous data for dynamic images or static images without any timing adjustment by a line buffer memory or the like according to the present invention.

What is claimed is:

1. A method for performing at least one of recording an image signal including blanking periods on and reproducing an image signal including blanking periods from a recording medium with a probe, said method comprising the steps of:

relatively moving the recording medium and the probe in order to scan a surface of the recording medium with going and returning by the probe;

detecting horizontal blanking periods of the image signal; and inverting the going and returning scan during selected ones of detected horizontal blanking periods of the at least one of the image signal being recorded and the image signal being reproduced.

2. A method according to claim 1, wherein a voltage is applied between the recording medium and the probe by voltage applying means to perform the at least one of the recording and reproducing by a tunneling current flowing thereby.

3. A method according to claim 1, wherein said image signal is a dynamic image signal.

4. A method according to claim 1, wherein said image signal is a static image signal.

5. A method for at least one of recording an image signal including blanking periods on and reproducing an image signal including blanking periods from a recording medium with a probe, comprising the steps of:

relatively moving the recording medium and the probe in order to scan a surface of the recording medium with going and returning by the probe at a predetermined scanning frequency;

detecting horizontal blanking periods of the image signal; and inverting the going and returning scan during selected ones of detected horizontal blanking periods of the at least one of the image signal being recorded and the image signal being reproduced, wherein the scanning frequency is 1/n (n: positive integer) of a horizontal synchronous frequency of the at least one of the image signal being recorded and the image signal being reproduced image signal.

6. A method according to claim 5, wherein a voltage is applied between the recording medium and the probe by a voltage applying means to perform the at least one of the recording and reproducing by a tunneling current flowing thereby.

7. A method according to claim 5, wherein said image signal is a dynamic image signal.

8. A method according to claim 5, wherein said image signal is a static image signal.

9. An apparatus for performing at least one of recording an image signal including blanking periods on and reproducing an image signal including blanking periods from a recording medium with a probe, said apparatus comprising:

a recording medium;

the probe;

a moving mechanism for relatively moving the recording medium and the probe in order to scan a surface of the recording medium with going and returning by the probe;

detecting means for detecting horizontal blanking periods of the image signal, wherein the moving mechanism performs inverting of the going and returning scan during selected ones of detected horizontal blanking periods of the at least one of the image signal being recorded and the image signal being reproduced.

10. An apparatus according to claim 9, further comprising means for applying a voltage between the recording medium and the probe to perform the recording and/or reproducing by a tunnel current.

11. An apparatus according to claim 9, wherein said image signal is a dynamic image signal.

12. An apparatus according to claim 9, wherien said image signal is a static image signal.

13. An apparatus according to claim 9, further comprising an image input device for inputting the image signal to the apparatus.

14. An apparatus according to claim 9, further comprising a display device for displaying the image outputted from the apparatus.

* * * * *

UNITED STATES PATENT AND TRADEMARK OFFICE
CERTIFICATE OF CORRECTION

PATENT NO. : 5,581,364

DATED : December 3, 1996

INVENTOR(S) : KATSUNORI HATANAKA, ET AL.          Page 1 of 2

It is certified that error appears in the above-identified patent and that said Letters Patent is hereby corrected as shown below:

Title page,

AT [56] REFERENCES CITED

OTHER PUBLICATIONS

"Microsciopy"," should read --Microscopy",--.

COLUMN 1

Line 15, "for" should read --for a--.

COLUMN 3

Line 46, "feed back" should read --feedback--.

COLUMN 4

Line 47, "signal. Thereby" should read
        --signal, thereby--; and
    Line 59, "a dynamic image" should read --dynamic images--.

COLUMN 5

Line 28, "analogue" should read --analog--;
    Line 30, "are" should read --is--; and
    Line 36, "data" should read --body of data--.

UNITED STATES PATENT AND TRADEMARK OFFICE
CERTIFICATE OF CORRECTION

PATENT NO. : 5,581,364

DATED : December 3, 1996

INVENTOR(S) : KATSUNORI HATANAKA, ET AL.

It is certified that error appears in the above-identified patent and that said Letters Patent is hereby corrected as shown below:

COLUMN 6

Line 19, "image signal" should be deleted; and
    Line 54, "wherien" should read --wherein--.

Signed and Sealed this

Twenty-third Day of September, 1997

Attest:

BRUCE LEHMAN

Attesting Officer      Commissioner of Patents and Trademarks